United States Patent [19]

Cookson et al.

[11] 3,895,176
[45] July 15, 1975

[54] COAXIAL CONDUCTOR WITH TRAP FOR REMOVING PARTICLES FROM FLUID INSULATION

[75] Inventors: Alan H. Cookson, Pittsburgh; Owen Farish, Monroeville; John M. Gauntz, Trafford, all of Pa.

[73] Assignee: Westinghouse Electric Corporation, Pittsburgh, Pa.

[22] Filed: Aug. 1, 1973

[21] Appl. No.: 384,526

Related U.S. Application Data

[62] Division of Ser. No. 122,453, March 9, 1971, Pat. No. 3,814,879.

[52] U.S. Cl. .................................. 174/28; 174/29
[51] Int. Cl. .......................................... H01b 9/04
[58] Field of Search ............ 317/3; 174/28, 29, 116

[56] References Cited
UNITED STATES PATENTS

| | | | |
|---|---|---|---|
| 1,854,255 | 5/1932 | Green | 174/28 |
| 1,964,907 | 7/1934 | Emaveli | 174/116 |
| 2,576,163 | 11/1951 | Weston | 174/28 |
| 3,391,243 | 7/1968 | Whitehead | 174/28 |
| 3,515,909 | 6/1970 | Trump | 174/14 |
| R20,244 | 1/1937 | Peterson | 174/28 |

FOREIGN PATENTS OR APPLICATIONS

| | | | |
|---|---|---|---|
| 624,008 | 12/1935 | Germany | 174/29 |

Primary Examiner—E. A. Goldberg
Attorney, Agent, or Firm—M. J. Moran

[57] ABSTRACT

An electrically insulating conducting system which includes a cylindrical outer electrode inside of which is disposed another electrode. These electrodes may be energized. An electrically conducting tubular barrier member is disposed around the inner electrode but inside of the outer electrode. An electrically conducting particle trap is disposed close to the barrier. The outer electrode is utilized to enclose sulfur hexafluoride insulating fluid which acts as an insulating means for the electrical system. Some particles which may float in the sulfur hexafluoride gas become trapped between the electrically conducting barrier and the proximate electrically conducting particle trap because the electrically conducting particle trap distorts the electric field which exists between the hollow outer electrode and the innermost electrode when a potential difference exists therebetween. Consequently, any particle which somehow enters the region associated with the barrier and the particle trap has a high probability of becoming trapped in that region.

3 Claims, 32 Drawing Figures

PATENTED JUL 15 1975     SHEET 1     3,895,176

PATENTED JUL 15 1975　　3,895,176

SHEET 3

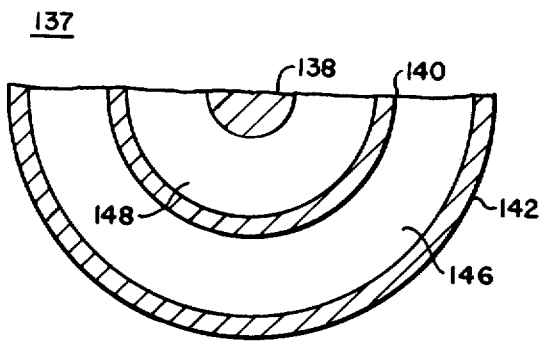
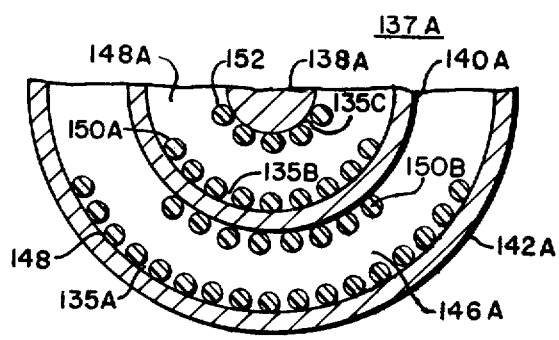
FIG. 12  FIG. 13
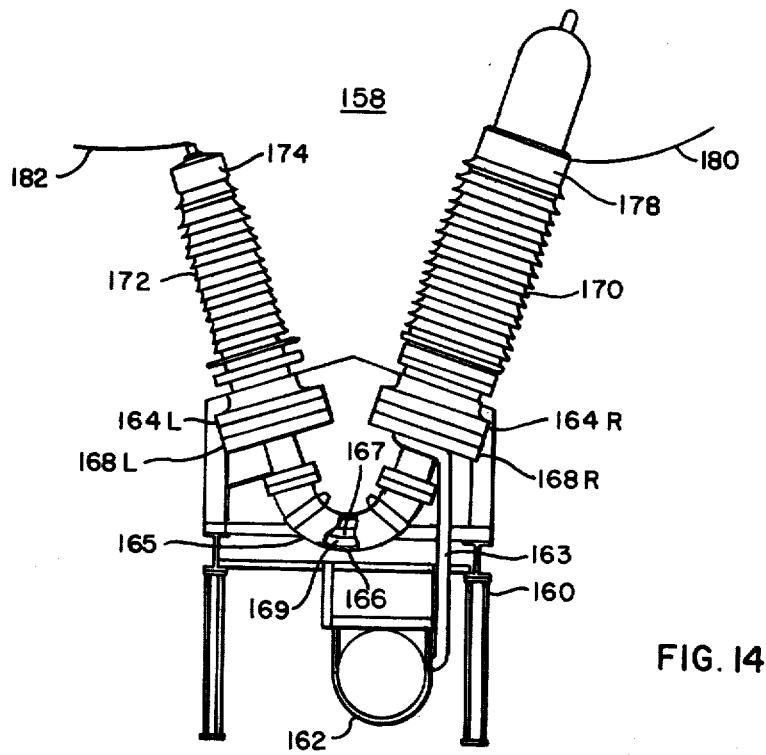
FIG. 14
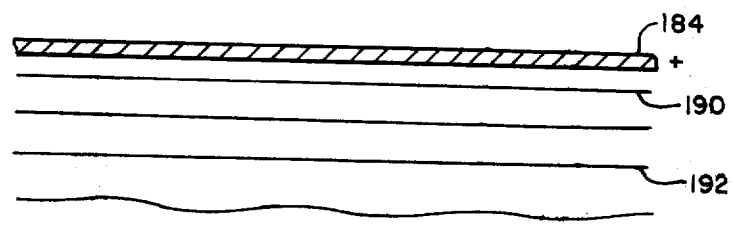
FIG. 11

PATENTED JUL 15 1975 3,895,176

SHEET 5

3,895,176

COAXIAL CONDUCTOR WITH TRAP FOR REMOVING PARTICLES FROM FLUID INSULATION

This is a division of application Ser. No. 122,453, filed Mar. 9, 1971, now U.S. Pat. No. 3,814,879 issued June 4, 1974.

BACKGROUND OF THE INVENTION

This invention relates to electrical insulating systems and more particularly to gas filled circuit breakers with particle traps and containment barriers.

Grounded metal particle traps have been used in conjunction with circuit interrupters using a fluid insulating medium. The traps are often located near the low voltage electrode of a gas containing tank which forms part of the circuit interrupter. This creates a relatively particle free region between the low voltage and the high voltage electrodes. Particles may move in this region but hopefully become trapped by the effect of the zero field created near the trap. Previously, in such known arrangements, particle traps have been metallic, electrically conducting grid arrangements where the metallic grid is grounded and creates a near zero field region because the grounded grid bars have the same potential as the grounded outer electrode or container. The spaces between the grid bars have a slightly different potential than that at the grid bars because of the way in which the equipotential lines distribute themselves in such spaces. The equipotential lines have a tendency to bend toward the grounded conductor or outer electrode container in the spaces where no grid bars exist. Once charged particles come into this region and make contact with the grounded conductor, the charged particles lose their charge and no longer attempt to migrate or move in the other direction because the near zero electric field between the metallic barrier and the outer electrode will not be sufficient to significantly accelerate them.

However, metallic barriers are difficult to properly design and shape, especially where the electrodes have relatively complicated surfaces. It would therefore be desirable if a particle trap could be formed from an easily molded material, such as epoxy resin, rather than from metallic grid material as in known particle traps. In addition, it would be desirable if a particle trap were adapted to be disposed near the high voltage electrode of the circuit interrupter to further enhance the insulating properties of the gas in this region.

An example of a metallic particle trap is disclosed in copending application Ser. No. 875,353 filed Nov. 10, 1969 by James M. Telford and R. J. Bohinc, now abandoned and assigned to the same assignee as the assignee of this invention.

SUMMARY OF THE INVENTION

In accordance with the invention, a high voltage circuit breaker having coaxially oriented or disposed high voltage and low voltage electrodes may be provided with a particle barrier to prevent a flashover or electrical breakdown between said electrodes. Various types of electrically insulating mediums, such as oil, sulfur hexafluoride gas, compressed air or vacuum may be used within the circuit breaker to electrically insulate the high voltage electrical conductor, from the low voltage or grounded concentric conductor which may be a tubular or circular tank. Where provided, the tank also acts as a containment vessel for the fluid insulating medium. In addition, in more recent improved gas-insulated circuit breakers, the same gas which is employed as a dielectric medium is also used in a puffer arrangement to help extinguish the arc drawn upon opening the circuit breaker contacts and is, therefore, required to be pressurized at relatively high values of pressure, such as approximately 250 pounds per square inch. However, at such relatively high pressures, flashovers or voltage breakdowns initiated or triggered by suspended particles which become charged in the insulating medium become more prevalent than at relatively lower pressures. Consequently, it is necessary to prevent such flashovers or breakdowns. In a typical sulfur-hexafluoride gaseous insulating medium, particles, such as fine metal chips which fall off of the milled conductors oscillate between the high and low voltage electrodes. When a particle resides on a conductor, it takes on a charge of the same polarity as that of the conductor and therefore there is a tendency for the particle to be lifted by the applied field.

The complete action or phenomena whereby a breakdown occurs is not completely understood, but in accordance with one proposed theory, it is thought that as a charged particle nears an oppositely charged electrode under the influence of electric field attraction, a breakdown occurs before the particle touches the electrode. This breakdown may be called a "trigatron" breakdown and sets off an electron avalanche or series of larger avalanches which eventually cause the entire dielectric medium between the two electrodes involved to flashover or breakdown. Alternatively, it is thought that a particle may actually make contact with an electrode and adhere, creating a sharp point. It is known that sharp edges or points are the places where high voltage is most likely to initiate breakdown because of the concentration of potential stress or the accumulation of charge in a small region. One way to solve this problem in accordance with the invention is to keep particles from oscillating within the associated dielectric medium by means of an interelectrode dielectric barrier. Such barriers may be mounted between the high voltage and low voltage conductors in a generally concentric arrangement, especially in the areas of highest electrical stress. The area or region between the high voltage electrode and the barrier may then be carefully cleaned to remove most of the visible particles. The resulting structure includes a high voltage conductor, and a concentric barrier mounted within the concentric low voltage conductor. Even though the region or area between the barrier and the high voltage conductor is then relatively free of particles, the improvement provided by the barrier can nevertheless be enhanced by mounting a dielectric particle trap adjacent or proximate to the inside of the barrier. An additional similar particle trap may also be mounted near the high voltage conductor or near the low voltage conductor or in combination in all three of the above locations. The dielectric particle trap is mounted close to either the barrier or the low voltage conductor and functions to prevent flashovers between a high voltage conductor and a low voltage conductor which may be a tank. A dielectric material, such as epoxy resin, with a hydrated alumina filler has the property of changing the electric potential and field strength wherever a body formed from such a material is disposed. A particle trap as disclosed is preferably formed from such dielectric material having a relatively high permittivity. The particle trap may be of any desired shape, preferably one which takes advantage of the effect of gravity on the particles to be trapped. It is preferably mounted therefore adjacent to the lowest elevation of the region to be protected. The particle trap preferably includes corrugations or holes whereby the electric field is weaker neear the valleys or the corrugations or holes. Consequently, any particle, whether it be metallic or dielectric which moves toward the barrier or the low voltage electrode, may flow past or through the particle trap, touch the other electrode, assume its change, and then remain near the trap because the effect of gravity cannot be overcome by the weakened electric field. This operation is especially desirable because the larger a particle is, the more likely it is to cause arcing or a voltage breakdown, but the larger particle is the one that is more easily trapped because it is heavier and the effect of gravity is greater in keeping it trapped. A similar particle trap may be provided near the high voltage electrode to perform a similar function. The high voltage electrode particle trap may include hollow grooves or buckets disposed on the inside of the trap which catch rebounding particles that have been attracted within the zero field region and then attempt to float out again under the effect of gravity. These trapped particles remain trapped in the particle trap in the same manner as the particle which is trapped near the low voltage conductor.

BRIEF DESCRIPTION OF THE DRAWINGS

FIG. 11 shows a set of capacitor plates with an interposed corrugated dielectric particle trap;

FIG. 12 shows a coaxial conducting system with interposed barrier;

FIG. 13 shows a coaxial conducting system similar to the one shown in FIG. 12 with four radially interposed particle traps;

FIG. 14 shows a circuit breaker system in which the primary embodiment of the invention is disposed;

DESCRIPTION OF THE PREFERRED EMBODIMENT

Figure 1:
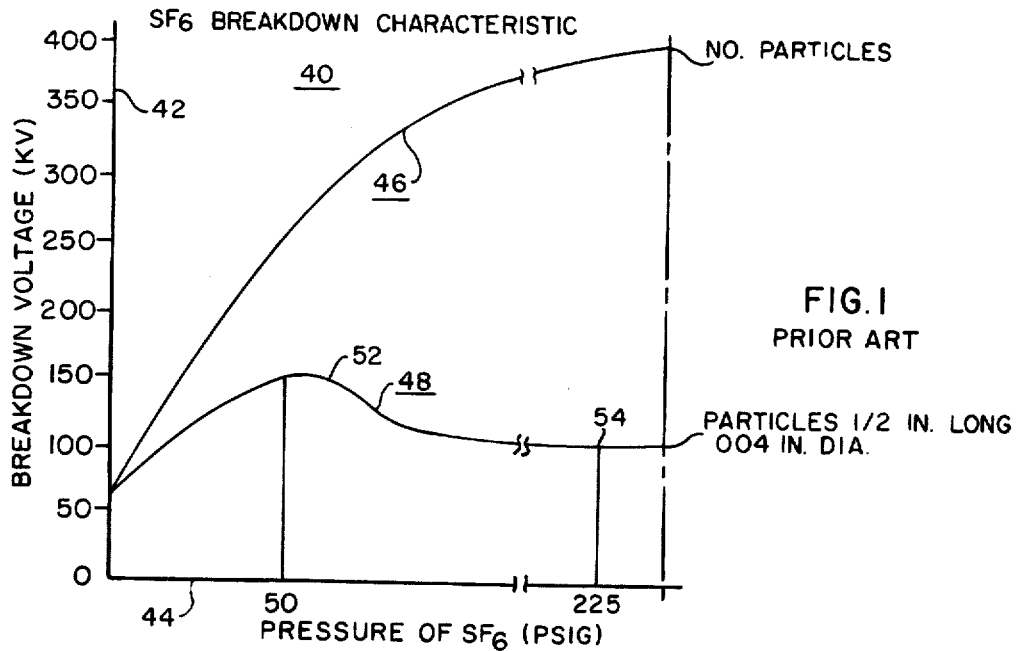
FIG. 1 shows a breakdown characteristic curve for sulfur hexafluoride.

Referring now to the drawing and FIG. 1 in particular, a sulfur hexafluoride insulation breakdown characteristic 40 is depicted wherein alternating breakdown voltage in kilovolts (rms) is measured on the ordinate 42 and pressure in pounds per square inch gauge is measured on the abscissa 44. Plot or curve 46 shows the breakdown characteristic between two electrodes for sulfur-hexafluoride insulating gas with virtually no particles immersed or present in it. On the other hand, plot or graph 48 shows the breakdown characteristic between the same two electrodes for sulfur hexafluoride gas which has ½ inch long by 0.004 inch diameter cylindrical particles immersed in it. As can be seen by inspecting characteristic or graph 40, sulfur hexafluoride insulating fluid with particles immersed in it breaks down at a relatively much lower voltage than the same gas without particles immersed in it. In an improved type of circuit interrupter, as disclosed in copending application Ser. No. 875,353 filed by James M. Telford and R. J. Bohinc on Nov. 10, 1069, sulfur hexafluoride insulating fluid is maintained at a pressure of approximately 225 lbs. per square inch gauge. At this pressure, the sulfur hexafluoride acts not only as an insulating medium for live electrical components within the circuit breaker but also is employed in a puffer or blower arrangement to assist in extinguishing an arc which may occur when the circuit breaker or circuit interrupter is actuated to open an electrical current carrying circuit. However, unless the sulfur hexafluoride is relatively particle free as is seldom the case, the breakdown voltage of the protected electrical insulated circuit breaker is approximately 100 kilovolts at 225 lbs. per square inch gauge pressure. This is shown graphically at point 54 on curve 48 of breakdown characteristic 40. However, circuit breakers employing sulfur hexafluoride at this pressure are usually required to withstand a voltage of approximately 230 kilovolts or greater. Consequently, a contaminated sulfur hexafluoride insulating medium maintained at a pressure of 225 lbs. per square inch will not provide adequate electrical insulation.

Figure 2:
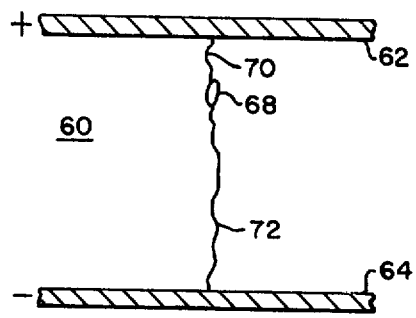
FIG. 2 shows a set of capacitor plates with an interposed particle.
Figure 3:
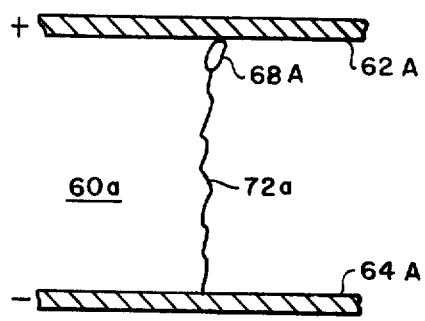
FIG. 3 shows a set of capacitor plates with an interposed particle.

The reason that the pressurized sulfur hexafluoride insulating medium with contaminating particles immersed in it does not properly insulate may be understood by referring to FIGS. 2 and 3. In FIG. 2, a parallel plate capacitor arrangement 60 having a high voltage capacitor plate or conductor 62 and a low voltage capacitor plate or conductor 64 is shown. Interposed between plates 62 and 64 is a particle 68. Particle 68 may be dielectric or metallic in nature. In other words, it may be either an electrically insulating or an electrically conducting particle. In FIG. 2, particle 68 is shown in a position proximate to parallel plate or conductor 62, whereupon it is thought that a small electrical discharge may take place between the particle 68 and the conductor 62. The discharge 70 may cause an avalanche discharge 72 to continue from particle 68 to negative conductor or capacitor plate 64 thus causing a complete electrical breakdown between capacitor plates 62 and 64. This operation demonstrates the "trigatron" effect.

A second possible theory is demonstrated graphically in FIG. 3 wherein a similar parallel plate capacitor arrangement 60A having a positive conductor or plate 62A and a negative conductor or plate 64A is shown. A similar particle 68A is shown attached to or abutting against plate 62A. It is thought in this instance that the protrusion caused by particle 68A jutting or projecting from plate 62A creates a point where there is a relatively high concentration of potential stress and from where a voltage breakdown as indicated by jagged line 72A may easily occur. Regardless of which theory explains the breakdowns described, it is clear that the presence of particles 68 or 68A as shown in FIG. 2 or FIG. 3, respectively, is a significant cause of electrical breakdown between conductors at different potentials.

Figure 4:
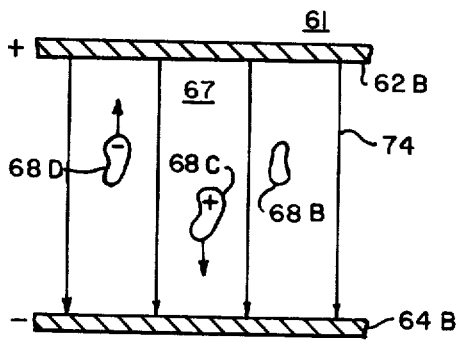
FIG. 4 shows a set of capacitor plates with interposed charged particles and electric field lines.

Referring now to FIG. 4, another parallel plate capacitor arrangement 61 is shown wherein parallel plate capacitor 61 has positive electrically conducting plate 62B and negative electrically conducting plate 64B. Interposed between plates 62B and 64B is a plurality of particles 68B, 68C and 68D. Some particles, such as particle 68B, have no charge and float randomly in insulating fluid 67. Other particles, such as particle 68D, have a negative charge and are thus attracted to positively charged capacitor plate or electrode 62B, while a third type of particle, such as particle 68C, has a positive charge and is attracted to the negatively charged capacitor plate 64B. These charged particles are accelerated due to the influence of an electric field 74 between plates 62B and 64B. As can be seen by reference to FIGS. 2 and 3, as the charged particles 68C and 68D in FIG. 4 migrate or move to the plates of the respective opposite polarities, the trigatron effect or the "abutting electrical particle" effect may occur causing a discharge or breakdown between plates 62B and 64B. Of course, it may also be possible for the particles 68D and 68C to migrate to the respective plates of opposite polarity 68D and 68C and merely discharge without casing a breakdown between capacitor plates 62B and 64B. In this case, the respective particles 68D and 68C will merely acquire the charge of the plates 62B and 64B respectively, to which they have migrated and begin to move towards the oppositely charged plates 64B and 62B respectively. This phenomena could possibly continue indefinitely, only occasionally causing a breakdown in the gaseous voltage insulation, discussed previously.

Figure 5:
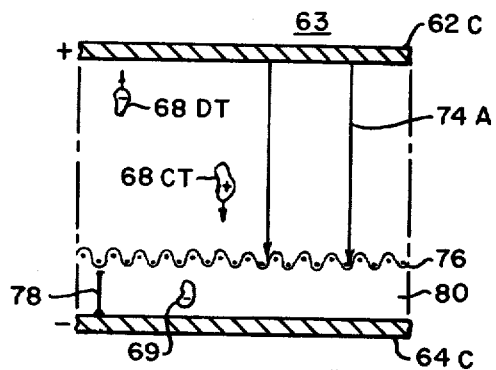
FIG. 5 shows a set of capacitor plates with a metal grid particle trap.

Referring now to FIG. 5, a proposed method for preventing voltage breakdowns due to migrating charged particles such as 68DT and 68CT is shown in capacitor combination 63 which includes a pair of oppositely charged electrodes or plates 62C and 64C and a metallic grid or screen 76 which is grounded or connected to one electrode 64C by a conductor 78. In this case, particles 68CT and 68DT corresponding to particles 68C and 68D in FIG. 4 migrate as previously described. However, the electric field shown by lines 74A extends only to the metallic grid 76 since it is at the same potential as plate or conductor 64C. Consequently, any particle such as particle 69 which has filtered through the grid or screen 76 finds itself in a zero field or field free region 80 wherein no accelerating forces exist to cause the particle 69 to migrate or move to the oppositely charged plate 62C.

Figure 6:
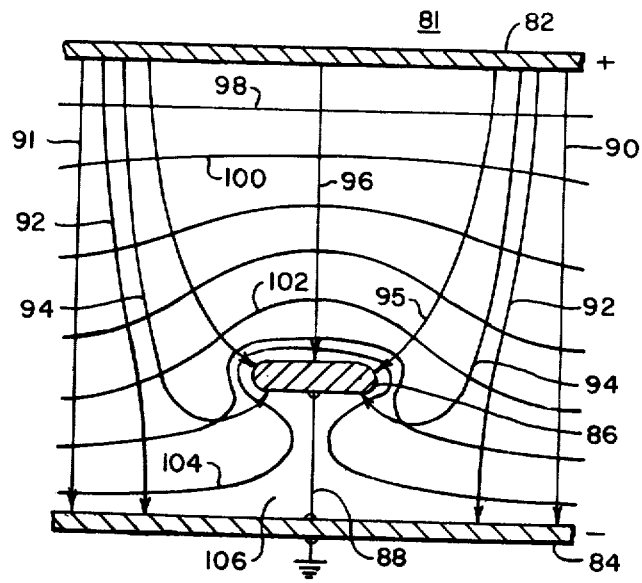
FIG. 6 shows a set of capacitor plates with an interposed conductor.
Figure 7:
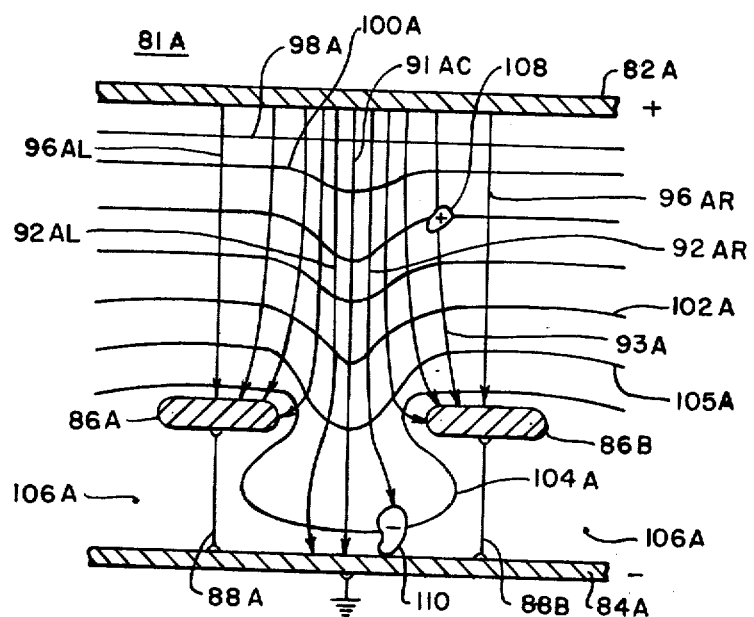
FIG. 7 shows a set of capacitor plates with a pair of interposed conductors forming a section of a particle trap.

Reference to FIGS. 6 and 7 illustrates why the metallic grid or screen 76 acts as a particle trap. More specifically, FIG. 6 shows a parallel plate capacitor combination 81 similar to those shown previously having a positive capacitor plate 82 and a negative capacitor plate 84. As illustrated, plate 84 may be grounded, but the plate 84 is not necessarily required to be grounded in all applications. Interposed between plates 82 and 84 is a metallic, electrically conducting means or mass 86 connected electrically by way of line or conductor 88 to the negative or grounded plate 84. Since plate 84 and mass or grid piece 86 are interconnected they are both at substantially the same electrical potential. It should also be noted that electrically conducting bodies can have no electrical potential lines within the periphery of their mass or volume. In addition, all electric field lines must terminate at the periphery of such a body perpendicular to the periphery at the point of termination. An inspection of FIG. 6 shows two sets of lines. The generally horizontally oriented series of lines typified by lines 98 and 104 represent electrical potential lines and the generally vertical lines typified by lines 91 and 92 represent electrical field lines. Near the ends of the parallel plate capacitor, electric field lines 90 and 91 are generally straight and perpendicular (ignoring fringing) to both parallel plate conductors 82 and 84. In the middle or center of the region between the conductors 82 and 84 near conductor section 86, electric field line 96 is also generally straight between conducting surface 82 and conductor 86. However, between these two extremes, the electric field lines are affected by the presence of the conductor section 86. As a result electric field lines 92 and 94, as shown, on both the left and right of conducting mass 86 are distorted so as to terminate on that path of the electrical conducting system which comprises conductor 86 and conductor 84. As can be seen, electric field 92 is distorted or bent toward conductor 86, but terminates nevertheless on parallel plate capacitor section 84, whereas line 94 is forced to terminate on the electrically conducting mass 86. The electric field line 95 similarly terminates on conducting grid section or screen section 86.

The electrical potential at any point in the capacitor system 81 is determined by the electric field distribution such as in any given electrical system. As can be seen in FIG. 6, the electrical potential lines 98, 100, 102 and 104, for example, are bent and distorted to conform to the mathematical requirements for the field lines previously discussed. Equipotential lines 98, 100, 102, 104 represent lines of eqiupotential within the capacitor system 81. As can be seen, line 104 curves around electrically conducting mass 86 to show a relatively low field or field free region 106 existing beneath grid section 86. This field free section 106 is caused by the absence of a significant gradient in the electric field lines in this area because of the field lines are attracted to the equipotential surface of mass or grid section 86 rather than to the negative plate 84 of capacitor section 81.

Referring now to FIG. 7, a similar parallel plate capacitor system 81A is shown having positive capacitor plate 82A and negative capacitor plate 84A. There are two grid or screen sections or wires 86B and 86A connected to capacitor plate 84A by conducting segments 88A and 88B respectively. In addition, there are electric field lines, such as 91AC, between the various metallic or electrically conducting sections 86B and 86A, as described previously. Other electric field lines, such as line 96AL and line 96AR, extend between plate 82A and grid sections 86A and 86B, respectively. Still other electric field lines, such as field lines 92AR and 92AL, are distorted in the manner previously described. As before, equipotential lines or surfaces such as line 102A are shown intersecting the electric field lines. Equipotential line 98A which is near the plate 82A is relatively undistorted by the presence of the two metallic conductors 86B and 86A within the capacitor system 81A. However other equipotential lines, such as lines 104A and 102A, are distorted by the presence of the conductors 86A and 86B within the system 81A.

Also shown in FIG. 7 are two particles, a positively charged particle 108 and a negatively charged particle 110. It is to be understood that the particles 108 and 110 are immersed in an insulating fluid, such as sulfur hexafluoride gas, so that they may travel freely between capacitor plates 82A and 84A. Particle 108 being positively charged by positive plate 82A follows electric field line 93A toward grid section 86B whereupon it will discharge and acquire a negative charge from grid section 86B and migrate again toward positive conductor plate 82A. Negatively charged particle 110, however, has missed both grid sections 86A and 86B and instead has followed the electric field line 92AR to negatively charge conductor 84A. However, as can be seen, there is a relatively low electrical potential gradient between equipotential line 104A and equipotential line 105A as indicated by the relatively wide spacing between them. Consequently, the accelerating forces tending to move particle 110 towards conductor 82A are relatively small. In addition, the areas or regions under conducting sections 86A and 86B as indicated by the area 106 are almost entirely field free because the field lines such as 96AR are prevented from terminating at electrical conductor or plate 84A. Consequently, particle 110 is substantially immobilized within region 106A and prevented from migrating toward the electrode or plate 82A. Statistically, the probability is that each particle within a system such as shown in FIG. 7 will become trapped beneath the grid section 86A and 86B so that eventually no particles are free to migrate between the plates 82A and 89A of the capacitor 81A.

As can be seen, if a particle-contaminated insulating gas, such as sulfur hexafluoride, can be slowly decontaminated by the process previously described, then the breakdown voltage characteristics of the gas will gradually improve similar to the characteristic 46 shown in FIG. 1. Consequently, a high pressure gas, such as sulfur hexafluoride, at a pressure of approximately 225 lbs. per square inch gauge, even though initially contaminated by particles, may be used for both its arc-extinguishing properties and as an insulating medium, if a particle trap, such as that shown in FIG. 7 is provided to increase the voltage breakdown characteristics of the insulating gas.

Figure 8:
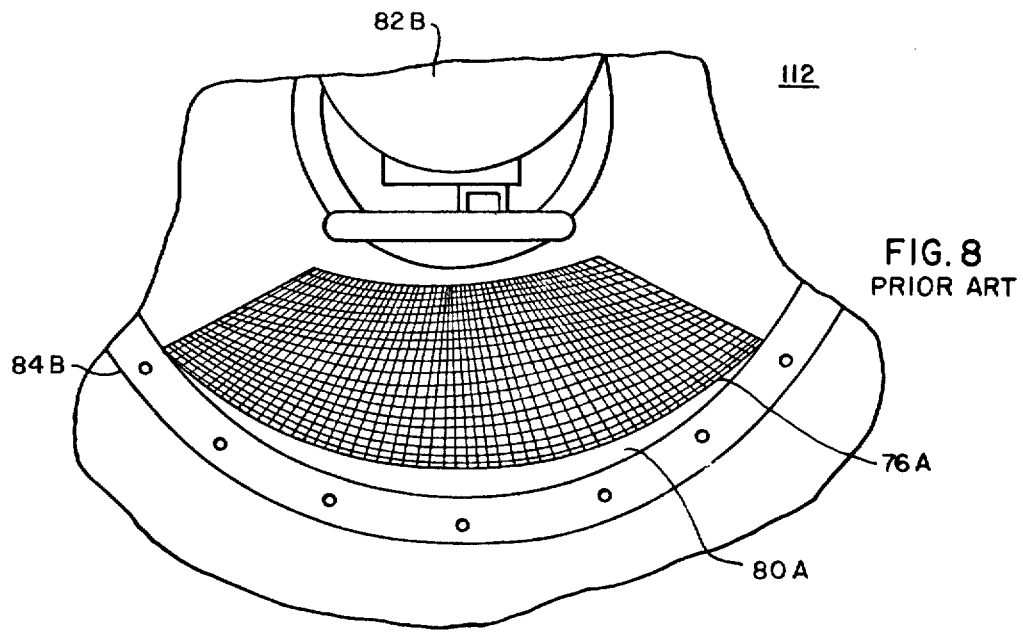
FIG. 8 shows an embodiment of a metallic grid particle trap in a circuit breaker.

The capacitor systems shown in FIGS. 2 through 7 each comprise two parallel plates. However, such capacitor systems may form part of a circuit breaker 112 shown in FIG. 8, where circuit breaker 112 includes a high voltage electrode 82B which is generally circular and cylindrical and a low voltage or grounded outer protecting case or electrode 84B which is generally cylindrical and hollow. Interposed between electrodes 82B and 84B is a screen or grid 76A having sections similar to grid sections 86A and 86B shown in FIG. 7. This construction forms a particle trap 80A between grid sections 76A and electrically conducting, grounded containing vessel or tank 84B where particles may become trapped. An insulating gas, such as sulfur hexafluoride, is disposed between the electrode 82B and the tank 84B as an insulating medium.

Figure 9:
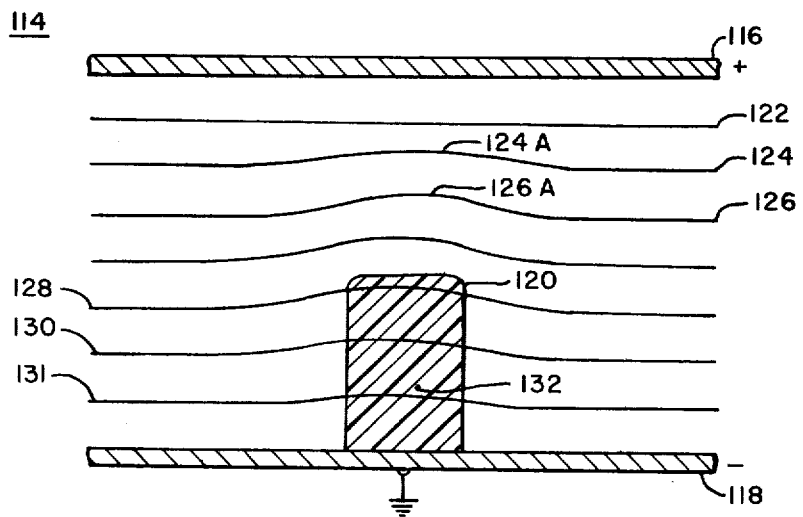
FIG. 9 shows a set of capacitor plates with an interposed dielectric mass.

Referring to FIG. 9, a parallel plate capacitor system 114 is shown which is generally similar to the capacitor systems shown in FIGS. 2 through 7. Capacitor 114 includes a positive electrode 116 and a negative electrode 118. Interposed between positive electrode 116 and negative electrode 118 is a dielectric or electrically insulating grid section or member 120. Electric field lines are not shown in FIG. 9 but the equipotential surfaces are shown, represented or indicated by equipotential lines 122, 124, 126, 128, 130 and 131, for example. As previously described, metallic electrically conducting bodies or masses or conducting mediums normally have no equipotential lines within them and the entire surface of an electrically conducting mass is at substantially the same electric potential. However, this is not true with a dielectric mass or body, and as indicated by equipotential lines 128, 130 and 131, potential differences may exist within a dielectric or electrically insulating mass or body. The permittivity of such a mass however tends to distort or refract the equipotential lines through a dielectric medium. Consequently, the presence of dielectric mass 120 in capacitor section 114 causes the equipotential lines to distort forming generally arcuate portions or undulations such as indicated at 124A on equipotential line 124 and undulations or generally curved portions 126A on equipotential line 126 which project toward the plate 116. Consequently, the area in the vicinity of region 132 tends to approximate the generally electric field free region 106A. The higher the permittivity of the dielectric material in mass 120, the greater the distortion of the equipotential lines 122, 124, 126, 128, 130 and the weaker the electric field in region 132.

Figure 10:
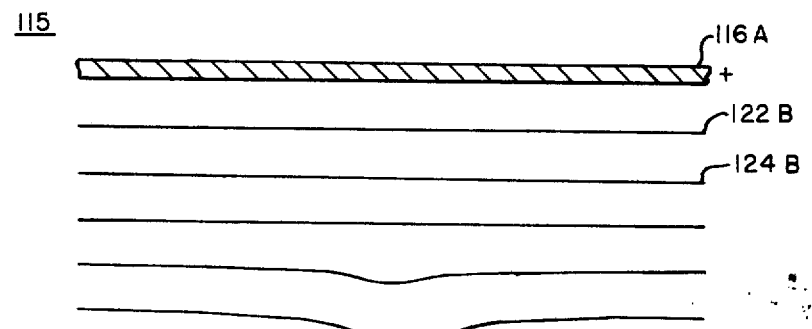
FIG. 10 shows a set of capacitor plates with a pair of cooperating interposed dielectric masses forming a section of a particle trap.
Figure 10:
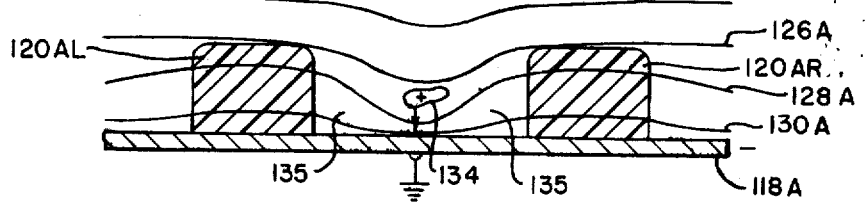

A capacitor section 115 is shown in FIG. 10 which includes positive capacitor plate 116A, negative capacitor plate 118A and two dielectric masses or bodies 120AL and 120AR disposed between electrodes 116A and 118A. These masses 128AL and 120AR together effectively form a section of a particle trap. As can be seen in FIG. 10, equipotential lines 122B and 124B are relatively undistorted, whereas equipotential lines 126A and 128A are greatly distorted by the presence of the dielectric masses or bodies 120AL and 120AR within the capacitor or electric field generating section 115. Consequently, a particle such as particle 134 which migrates or moves between dielectric masses 120AL and 120AR, subsequently discharges onto electrode 118A and finds itself in a relatively field free region 135 wherein accelerating forces caused by an electric field sufficient to cause particle 134 to migrate or oscillate toward capacitor plate or electrode 116A are not present to a substantial degree.

Consequently, a dielectric particle trap may be formed from a high permittivity dielectric material with portions spaced at proper intervals to allow charge particles to move or flow into the spaces or openings in the trap and prevent the return of these particles once they have discharged their charge on the associated electrode. It should be noted that a particle such as the particle 134 may be made of an electrically conducting material, such as steel, a dielectric material, or a semi-conducting material. Regardless of its composition, the particle 134 may still acquire a charge and be eventually trapped.

Referring to FIG. 11, another embodiment of the invention is illustrated in a particle trap which is formed from dielectric material. In this case, a capacitor section 183 comprises positive electrode 184, negative electrode 186 and an undulating or corrugated section of dielectric material 188 having a plurality of alternate valleys or depressions 185 and peaks or plateaus 187. The equipotential lines indicated at 190, 192 and 194 is greater near peaks 187 and less near valleys 185 creating low field regions 135D in the vicinity of the valleys 185. Consequently, any charged particles present which tend to migrate towards electrode 186 become entrapped in the low field regions 135D in the valleys 185 and tend to remain there.

FIG. 12 shows a coaxial electrical conducting system 137 which includes high voltage electrode 138 and low voltage electrode 142, where low voltage electrode 142 acts as a containing tank for high pressure sulfur hexafluoride insulating gas 146. Interposed between electrodes 142 and 138 is a barrier 140 which also acts as a containing means for sulfur hexafluoride insulating fluid 148. In FIG. 12, electrode 138 is the high voltage electrode and electrode 142 is the low voltage electrode and particles in the gas tend to oscillate between electrode 138 and electrode 142, such particles being stopped only by the barrier 140. It should be noted that barrier 140 may either be dielectric or metallic depending upon the particular type of coaxial system.

FIG. 13 shows a coaxial system 137A similar to that shown in FIG. 12 which may include high voltage electrode 138A, dielectric non-electrically conducting or metallic electrically conducting barrier 140A, low voltage electrode 142A and sulfur hexafluoride or insulating regions 146A and 148A interposed between said barrier and the electrodes 142A and 138A, respectively. The system 137A may include a plurality of dielectric or metallic particle trapping structures 152 which may be generally circularly shaped, such as associated with high voltage electrode 138A, where particles are trapped in regions 135C. The system 137A may also or independently include a similar dielectric or metallic particle trap 150A with openings or spaces 135B disposed and spaced around the inner diameter of barrier 140A wherein a low field region results and particles are trapped, or it may also or independently include a similar trap 150B disposed around the outer diameter of barrier 140A wherein a low electric field region results and particles are trapped. Finally the system 137A may also or independently include a particle trap such as but not limited to a plurality of electrically insulating rods 148 with generally circular cross-sections which are disposed close to the inner surface of electrode 142A where particles may be trapped between the adjacent trapping structure 148 in the regions 135A.

Referring now to FIG. 14, a circuit breaker 158 is shown in which the teachings of this invention are incorporated. Circuit interrupter or breaker 158 comprises a pair of insulated breaker sections 170 and 172, each of which may include a means for establishing and interrupting an arc. Disposed at the lower ends of sections 170 and 172 are interfacing plates or means 164R and 164L, respectively. Terminal means 178 is provided at the top of section 170 to connect circuit breaker 158 to an external circuit indicated at 180 and terminal means 174 is provided at the top of section 172 to connect the circuit breaker 158 to external circuitry 182. Interposed between sections 172 and 170 is a generally C-shaped or U-shaped coaxial conducting section 165. Coaxial system 165 comprises a central electrical conductor 167 and a containing tank electrode or outer conductor 166. Coaxial system 165 is joined to breaker section or circuit interrupter interfacing means 164R at the coaxial conducting system or particle trap interfacing means or plate 168R, and is joined to breaker section interfacing means 164L at coaxial conducting system interfacing plate or means 168L. A gas reservoir 162 containing sulfur hexafluoride gas is provided with means 163 to allow the insulating gas to flow into circuit breaker sections 165, 170 and 172. Insulating gas is normally disposed in region 169 of section 165. The insulating gas is maintained at a relatively high pressure, such as 225 pounds per square inch (gauge) so as to act as both an insulating medium and an arc extinguishing medium or puffer gas in breaker sections 170 and 172. Therefore, generally electrically insulating or dielectric masses interposed between electrodes of differing potential may operate to trap or isolate or immobilize relatively freely oscillating particles between the electrodes and gradually result in a practicle free gaseous insulating region between the electrodes, this principle is not limited to a circuit breaker. The insulating medium may be a gas, such as sulfur hexafluoride, or an insulating oil such as is employed in a circuit breakers or it may be a vacuum medium. Any particles which freely oscillate and randomly migrate within the insulating fluid will become eventually trapped by the various trapping structures of the different embodiments of the invention previously described and those described hereinafter.

Figure 15:
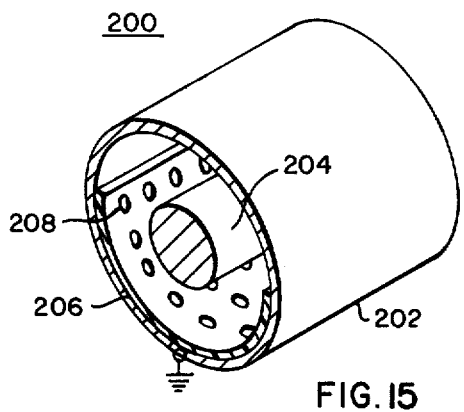
FIG. 15 shows a two element coaxial conductor system with particle trap.

Another embodiment of the invention is illustrated in FIG. 15 in a coaxial two element electrical conducting system 200 having a relatively high voltage electrode 204 and a relatively low voltage or grounded cylindrical electrode 202. Electrode 202 serves the dual purpose in this and of the following embodiments of acting as a containing tank or enclosure for the particle-laden insulating fluid which forms parts of the system. Coaxial conducting system 200 includes a hollow, generally cylindrical dielectric particle trapping mass or body 206 having a plurality of spaced holes or recesses 208 disposed around its periphery and along its longitudinal axis. The practicle trap 206 is disposed inside and directly adjacent to the electrode 202 and extends around the inner periphery of the electrode 202. In the operation of the system 200, any randomly migrating particles (not shown) becomes trapped within the holes 208 of dielectric or insulating member 206 for the reasons previously explained.

Figure 16:
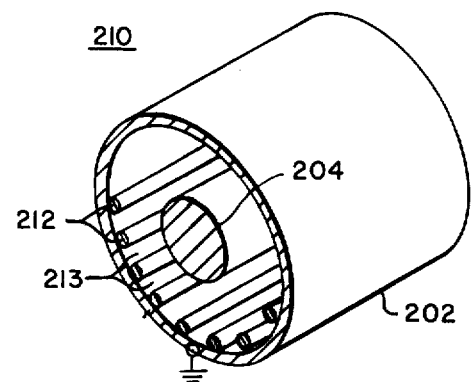
FIG. 16 shows a two element coaxial conducting system with a second embodiment of particle trap.

A two element coaxial system 210 similar to system 200 is shown in FIG. 16, having a high voltage electrode 204 and a low voltage combination electrode and gas containment tank 202, wherein dielectric rods are longitudinally disposed generally parallel to the electrodes 202 and 204 near containing tank electrode 202 and between electrodes 204 and 202. Particles are trapped in the relatively field free regions 213 between adjacent dielectric rods 212.

Figure 17:
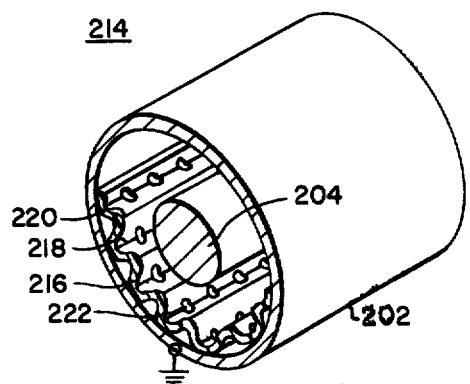
FIG. 17 shows a two element coaxial conducting system with a third embodiment of a particle trap.

FIG. 17 shows a coaxial electrical conducting system 214 with a positive or high voltage electrode 204 and a negative or low voltage grounded electrode 202 comprising a hollow generally cylindrical undulating or corrugated particle trap 216 with a plurality of alternate peaks 220 and valleys 218 and a plurality of axially spaced holes or open spaces 222 in each of the valleys 218 so that any particles present become trapped in a manner similar to that described in connection with FIG. 11 and FIG. 15.

Figure 18:
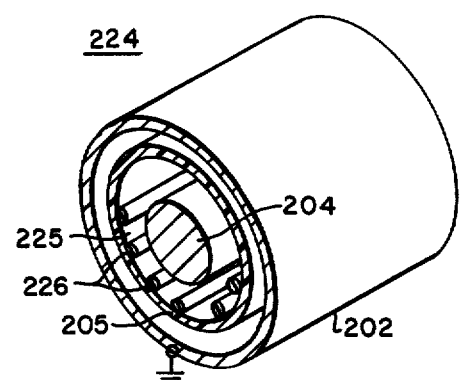
FIG. 18 shows a three element coaxial conducting system with a barrier particle trap.

FIG. 18 shows still another embodiment of the invention in a three element coaxial electrically conducting system 224 with high voltage electrode 204 and low voltage containment tank electrode 202 and an interposed barrier means or structure 105 where barrier structure 205 may be made of a dielectric material. A plurality of spaced dielectric or metallic, electrically conducting rods 226 are shown disposed to extend longitudinally and generally parallel to the electrodes 202 and 204 arranged proximate to barrier 205 in a manner similar to the way rods 212 are arranged with respect to electorde 202 in FIG. 16. Rods 226 accomplish the same purpose as rods 212 in FIG. 16 in that the spaces 225 between rods 226 trap any particles that are present between high voltage electrode 204 and barrier 205. It should also be noted that where desired rods 226 may also be made of an electrically conducting material and perform a similar trapping function.

Figure 19:
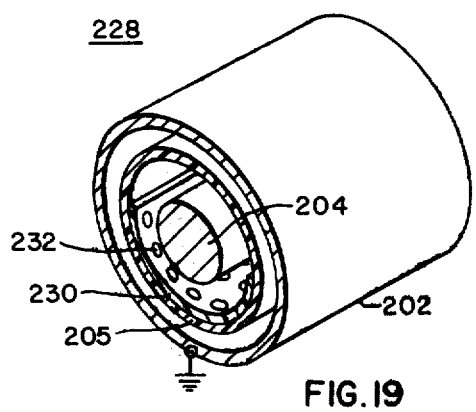
FIG. 19 shows a three element coaxial conducting system with a second embodiment of a barrier particle trap.

FIG. 19 shows a three element coaxial system 228 having high voltage electrode 204, low voltage containment tank electrode 202 and dielectric barrier 205. A dielectric or metallic particle trap 230 with a plurality of spaced holes or recesses 232 similar in shape to particle trap 206 shown in FIG. 15 is disposed between high voltage electrode 204 and barrier 205 and directly adjacent to barrier 205 to trap any particles which may exist within this volume or space.

Figure 20:
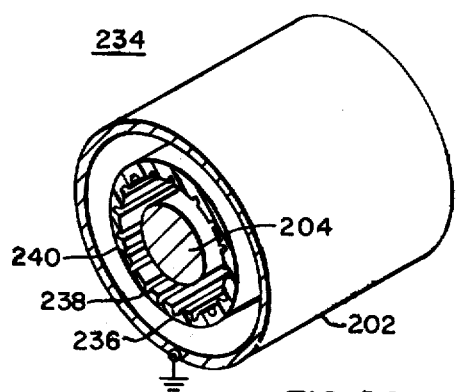
FIG. 20 shows a three element coaxial system with a third embodiment of a barrier particle trap.

FIG. 20 shows still another embodiment of a three element coaxial electrically conducting system 234 comprising a high voltage electrode 204, a low voltage or grounded containment tank electrode 202 and an interposed combination dielectric barrier and trapping structure 236 having a plurality of alternate plateaus or peaks 240 and valleys 238 which extend longitudinally with respect to the electrodes 202 and 204. In operation of the system 234, any particles which might otherwise oscillate between high voltage conductor 204 and low voltage conductor 202 within the region near the combination particle trap and barrier 236 are trapped or immobilized in valleys 238.

Figure 21:
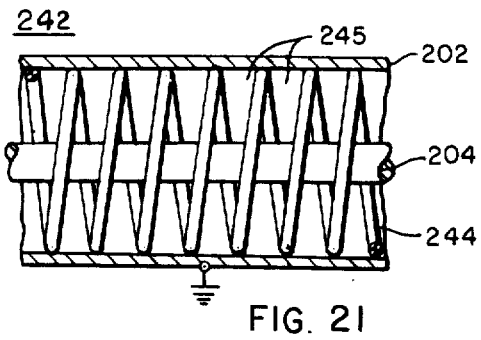
FIG. 21 shows a side view of a two element coaxial conducting system with a fourth embodiment of a particle trap.

FIG. 21 shows still another embodiment of the invention in a two element coaxial electrically conducting system 242 comprising a high voltage electrode 204 and a tank electrode 202 wherein containment tank or electrode 202 contains a fluid insulating means, such as oil or sulfur hexafluoride, which may contain randomly moving charged and uncharged particles. The trapping means in this case is a generally helical dielectric rod 224 having a coil spring shape and disposed to extend longitudinally with respect to outer containing tank electrode 202. The charged particles are trapped in region 245 between adjacent sections or turns of the spiral non-conducting rod 244.

Figure 22:
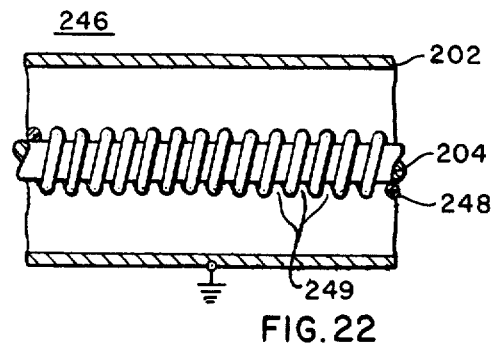
FIG. 22 shows a two element coaxial conducting system with an embodiment of a high voltage electrode particle trap.

FIG. 22 shows another embodiment of a two-component axial electrically conducting system 246 comprising a containing tank electrode 202, a high voltage electrode 204 and a metallic or dielectric rod formed in a generally helical shape and mounted around and adjacent to the high voltage electrode 204 so that it encircles electrode 204 in a generally concentric manner. Any oscillating particles tend to be trapped in the area or regions 249 between adjacent sections or turns of the rod 248.

Figure 23:
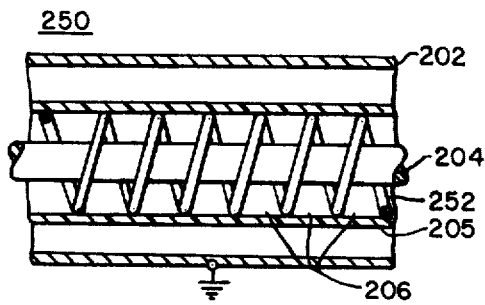
FIG. 23 shows a three element coaxial conducting system with a fourth embodiment of a barrier particle trap.

FIG. 23 shows another embodiment in a system 250 which includes a generally helical rod in a trapping structure or means wherein the concentric coaxial conducting system 250 comprises a high voltage electrode 204, a low voltage gas containing tank electrode 202 and a hollow generally cylindrical dielectric or metallic barrier 205. A generally helical dielectric or metallic rod 252 similar to rod 248 shown in FIG. 22 and a rod 244 shown in FIG. 21 is mounted proximate to the barrier 205 so that any particles which are present in the space between the high voltage electrode 204 and the barrier 205 are trapped in regions 206.

Figure 24:
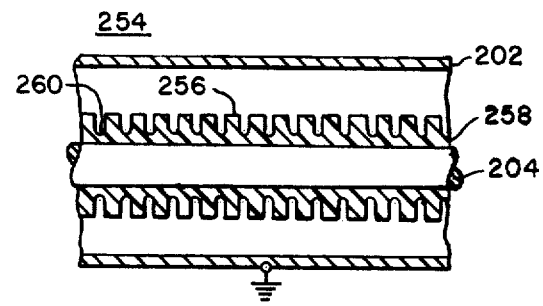
FIG. 24 shows a two element coaxial conducting system with a second embodiment of a high voltage electrode particle trap.

FIG. 24 shows another embodiment of the invention in a coaxial conducting system wherein a molded dielectric or metallic trapping structure 258 encircles or is disposed to enclose high voltage electrode 204. Low voltage or fluid containing tank electrode 202 concentrically encircles or is disposed to enclose high voltage rod 204 and particle trap 258. Particle trap 258 has a plurality of spaced plateaus or ridges 256 alternating with valleys 260 so that any particles which may randomly float between a high voltage electrode 204 and a low voltage electrode 202 become trapped in valleys 260 in the manner described previously.

Figure 25:
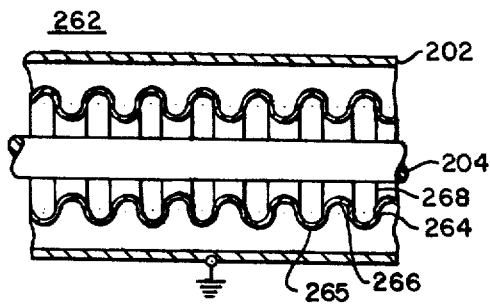
FIG. 25 shows a two element coaxial conducting system with a third embodiment of a high voltage electrode particle trap.

FIG. 25 shows a coaxial conducting system similar to that shown in FIG. 24 wherein a corrugated shaped dielectric trap is mounted proximate to the electrode 204 by means of axially spaced supports 268 wherein particles trapping structure 264 comprises a plurality of spaced peaks 265 and valleys 266. In operation, the substantially reduced electric fields in valleys 266, immobilize charged particles which would otherwise tend to oscillate between electrode 204 and electrode 202.

Figure 26:
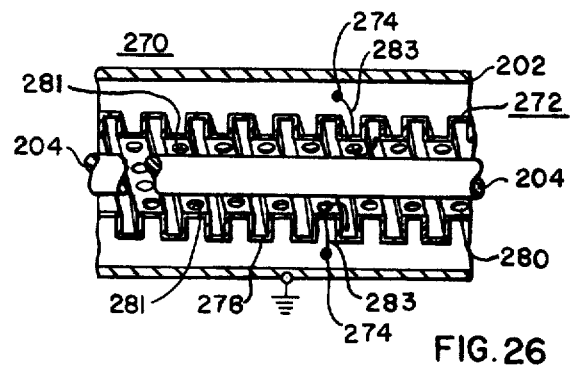
FIG. 26 shows a two element coaxial conducting system with a fourth embodiment of a high voltage electrode particle trap.

FIG. 26 shows still another embodiment of the invention in a coaxial electrical conducting system comprising a high voltage electrode 204, a low voltage containing tank electrode 220, and a particle trap 272 mounted relatively closer to the high voltage electrode 204. The particle trap mounting means is not shown in FIG. 26. The particle trap 272 comprises a generally helically shaped and generally cylindrically shaped dielectric or metallic trapping means 272 with a plurality of generally rectangular helical turns 278 which are closed on three sides and open toward the high voltage conductor 204. Interposed between ridges or trapping troughs 278 are valleys 280 which include the holes 281. The trapping structure 272 allows particles 274 to filter or move through holes 281 along path 283 toward the high voltage electrode 204 and become trapped in troughs 278 as indicated in FIG. 26.

Figure 27:
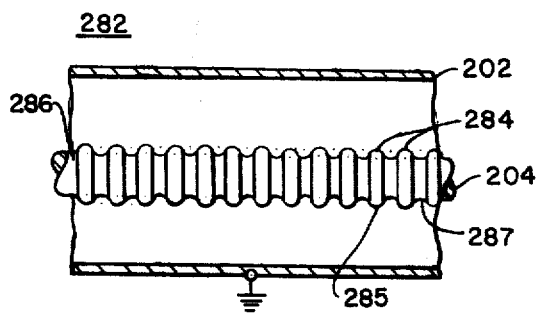
FIG. 27 shows a two element coaxial conducting system with a fifth embodiment of a high voltage electrode particle trap.

FIG. 27 shows another embodiment of the invention in a high voltage particle trap 285 which forms part of a coaxial conducting system 282 that includes a low voltage electrode 202 and a high voltage electrode 204. The particle trap 286 comprises a plurality of generally concentric, circularly shaped or ring-shaped structures 284 spaced longitudinally or axially along conductor 204. The generally circular sections 248 have curved or rounded peaks 285. The spaces 287 between circular structures 284 comprise low intensity electric field regions which tend to trap oscillating charge particles.

Figure 28:
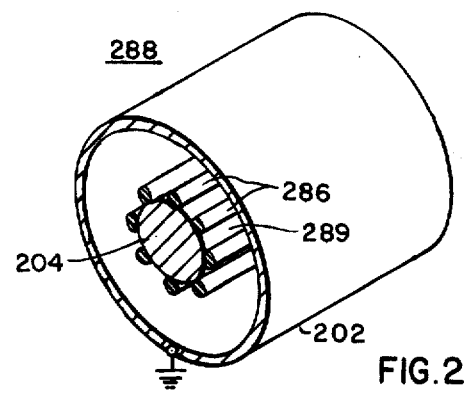
FIG. 28 shows a two element coaxial conducting system with a sixth embodiment of a high voltage electrode particle trap.

FIG. 28 shows another embodiment of the invention in a coaxial electrically conducting system 288 comprising a high voltage electrode 204, a low voltage grounded tank containing gas electrode 202, a particle trap comprising a plurality of longitudinally disposed dielectric rods 286 spaced around electrode 204. The rods 286 are formed from high permittivity dielectric material and comprise protrusions which are disposed on opposite sides of low electric density field regions 289, wherein charged particles are trapped.

Figure 29:
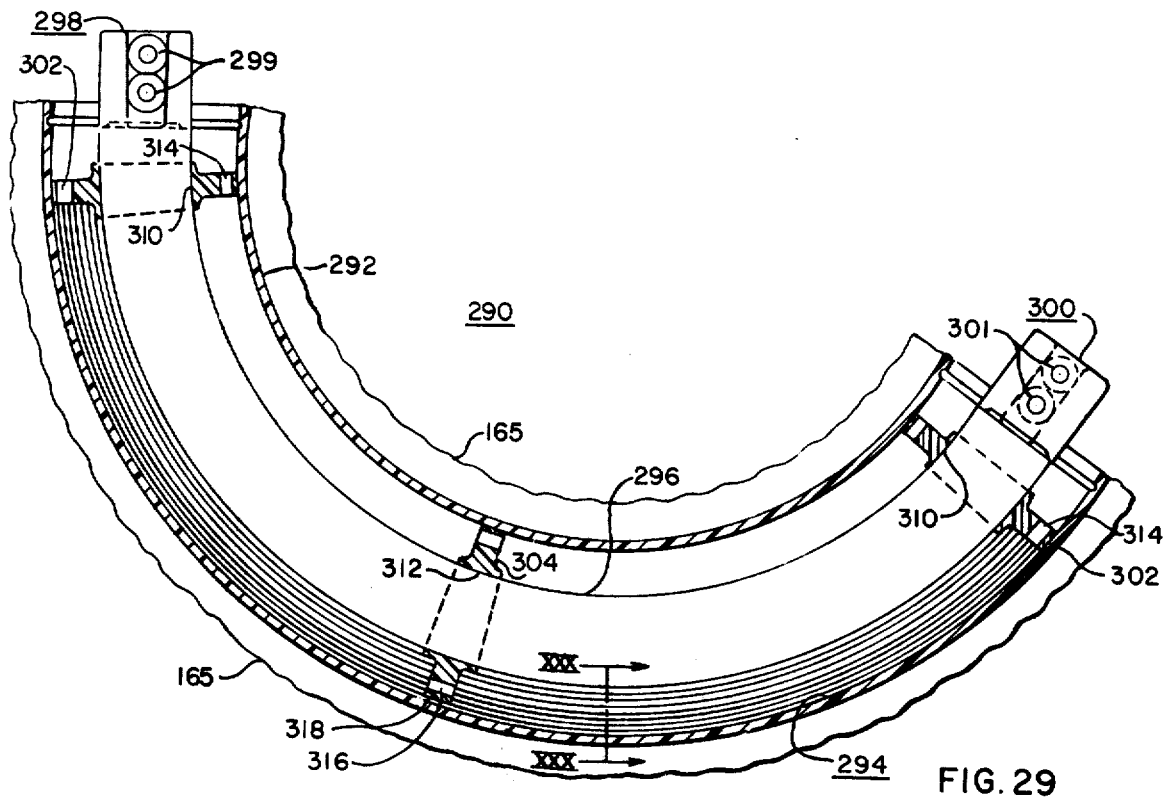
FIG. 29 shows a side elevation, sectional view of the primary embodiment of the invention.
Figure 31:
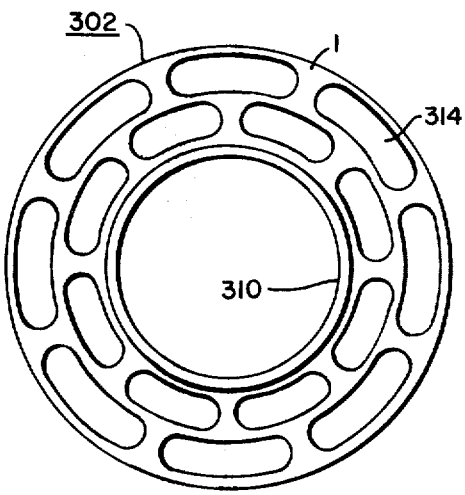
FIG. 31 shows a supporting brace for use with the primary embodiment of the invention as shown in FIG. 29.
Figure 32:
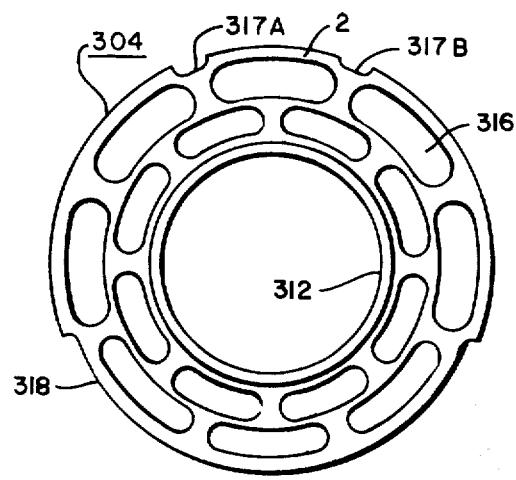
FIG. 32 shows a second supporting brace for use with the primary embodiment of the invention as shown in FIG. 29.

An important embodiment of the invention is illustrated in FIG. 29 in an electrically conducting system 290 similar to section 165 which includes grounded outer tank 165, and a dielectric barrier 292 which is generally circular in cross-section. Barrier 292 is formed in the shape of a cylinder which is bent or curved along a predetermined radius of curvature to form a hollow generally C-shaped or U-shaped barrier. Mounted within barrier 292 is a plurality of spaced supporting means 302 and 304 two of which (302) may be of the same construction. The electrically insulating supporting means or discs 302 are mounted inside barrier 292 at each end and supporting means or disc 204 is mounted inside barrier 292 near the center of the cylindrical barrier 292. All three supporting discs 302 and 304 have a central concentric hole or openings as indicated at 310 and 312, respectively. In addition, the discs 302 and 304 may each include a plurality of openings from which the dielectric material has been removed so as not to appreciably increase the electric stress at the conductor underneath said discs. For example, by referring to FIGS. 31 and 32, it can be seen that disc 302 may include a plurality of openings 314 and disc 304 may include a plurality of generally U-shaped cutouts 317A and 317B near the top of the disc 304 to facilitate installing disc 304 within barrier 292. The disc 304 may also include a cutout 318 on the bottom to allow disc 304 to clear certain projections or corrugations 294 provided in the barrier 292, shown in FIG. 30, which form a particle trap.

Referring again to FIG. 29, a circular solid electrically conducting segment 296 is supported by the combination of discs 302 and 304 and fits snugly against the discs 302 and 304 inside central holes 310 and 312 of supporting discs 302 and 304, respectively. Conductor 296 is a high voltage electrode whose opposite ends 298 and 300 are flat and adapted to be connected to electrodes (not shown) in a circuit breaker such as the circuit breaker 158 shown in FIG. 14. End 300 has two holes 301 to facilitate connecting the conductor 296 to one electrode in the circuit breaker and end 298 or interfacing means 298 has two holes 299 to facilitate connecting interfacing means 298 to another electrode in the circuit breaker.

Figure 30:
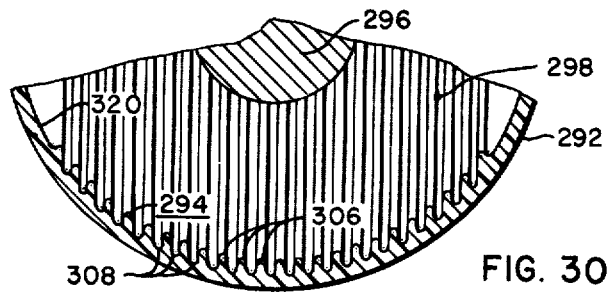
FIG. 30 shows a partial cross sectional view of the primary embodiment of the invention as indicated by arrows XXXX–XXXX shown in FIG. 29.

Referring to FIG. 30 dielectric barrier 292 includes a plurality of generally radial corrugations or grooves and protrusions 294 formed on the inside surface of the barrier 292 and extending longitudinally along the barrier 292 and extending circumferentially for at least a short distance around the inside periphery or surface 320 of the barrier 292. FIG. 30 shows a cross-sectional view of a portion of the particle trap 294 along plane XXX—XXX in FIG. 29. It will be noted that there is a plurality of molded or grooved alternating valleys 308 and peaks 306 forming the particle trapping section 294 along one portion of the particle trap 292. Any charged particles floating in the electrically insulating medium 398 provided, such as $SF_6$, will eventually be trapped in the valleys 308 of particle trap 294. It it to be noted that generally U-shaped particle trap barrier 292 may form generally the C-shaped conducting section 165 of circuit breaker 158 in FIG. 14.

It is to be understood that the various embodiments described may be employed in any high voltage insulating system, such as the circuit breaker 158 shown in FIG. 14 and previously described, including but not limited to insulating oil vacuum and insulating gases, such as sulfur hexafluoride and compressed air. It is also to be understood that the low voltage and high voltage terminals or electrodes described in the various embodiments of the invention may be interchanged where desired so that the outer containment vessel may be the high voltage electrode and the inner conductor may be the low voltage electrode.

It is also to be understood that at least six novel arrangements of particle traps are disclosed, the first of which is a dielectric particle trap mounted proximate to a low voltage concentric cylindrical electrode. The second is a dielectric particle trap mounted within a concentric barrier associated with a coaxial conducting system. The third is a metallic or electrically conducting particle trap associated with a dielectric barrier. The fourth is a metallic or electrically conducting particle trap associated with an electrically conducting source. The fifth is a metallic particle trap associated with a high voltage electrode. The sixth is a dielectric particle trap associated with the high voltage electrode.

It is also to be understood that electrically insulating particle traps as disclosed are preferably formed from a dielectric material having a relatively high permittivity, such as an epoxy resin material with an aluminum trihydrate filler. It is also to be understood that the various particle traps disclosed may be used in combination with one another so that a particle trap may be disposed near the high voltage electrode, one associated with an interposed dielectric barrier and a particle trap associated with the low voltage electrode may be used simultaneously in the same coaxial system or circuit breaker system. It is also to be understood that although the particle trap is primarily for use with relatively high voltage, high pressure insulating mediums, the teachings of the invention may be applied to low pressure insulating mediums.

It is also to be understood that the principles of the invention disclosed may be applied to other types of electrical systems, such as cables, enclosed bus bars, substations, transformers and lightning arrestors.

It is also to be understood that the teachings of the invention need not be limited to a coaxial conducting system.

It is also to be understood that the inter-electrode barriers such as shown in FIGS. 18, 19 and 20 for example, may be electrically conducting barriers.

It is also to be understood that as a third alternative to a metallic and dielectric barrier a semiconductor barrier may be used.

It is also to be understood that a system such as shown in FIG. 13 may have multi-interelectrode barriers such as barrier member 140A each of which may have particle traps mounted proximate to it.

The apparatus embodying the teachings of this invention has several advantages. For example, a dielectric particle trap with relatively complex shapes may be molded or cast rather than welded or brazed as required in forming known types of metallic particle traps. In addition, the particle traps as disclosed are generally lighter in weight and more easily repaired. Also, a particle trap of the type described can be used to quickly and easily remove charged particles which may be present in an electrically insulating fluid so that the property of the insulating fluid to protect against high voltage breakdowns is enhanced.

We claim as our invention:

1. An electrically conducting system comprising:
   a first hollow tubular electrical conductor;
   a second electrical conductor disposed within said first electrical conductor and spaced therefrom, said first and second electrical conductors having an electrical field present therebetween when one of said electrical conductors is energized at a different electrical potential than the other of said electrodes;
   electrically insulating fluid enclosed within said first conductor between said first and second spaced conductors;
   an electrically conducting barrier member disposed between said first and said second spaced conductors for deterring electrical flashover between said first and said second electrical conductors, unconnected electrically to said first conductor, unconnected electrically to said second conductor and unconnected electrically to any energy source; and
   an electrically conducting particle trap structure disposed proximate to said barrier and relatively closer to said barrier than to either said first or said second conductors, said particle trap structure distorting said electric field in such a manner as to provide a generally electric field free region near said electrically conducting barrier member, particles entering said generally electric field free region being generally immobilized because of the reduced accelerating forces in said generally electric field free region.

2. The combination as claimed in claim 1 wherein said electrically insulating fluid comprises sulfurhexaflouride.

3. The combination as claimed in claim 1 wherein said hollow tubular conductor is cylindrical.

* * * * *